United States Patent

Robinson

[11] Patent Number: 5,933,269
[45] Date of Patent: Aug. 3, 1999

[54] COMMON-LENS REFLECTIVE MAGNETO-OPTICAL SWITCH

[75] Inventor: Kevin C. Robinson, Zionsville, Pa.

[73] Assignee: Lucent Technologies Inc., Murray Hill, N.J.

[21] Appl. No.: 08/920,279

[22] Filed: Aug. 22, 1997

[51] Int. Cl.[6] .................................................. G02F 1/09
[52] U.S. Cl. ......................................... 359/280; 359/283
[58] Field of Search .................................... 359/280, 281, 359/283, 115–120, 181–184

[56] References Cited

U.S. PATENT DOCUMENTS 4,969,720  11/1990  Lins et al. .................................. 350/381
5,703,992  12/1997  Bergmann .................................. 385/139

*Primary Examiner*—Georgia Epps
*Assistant Examiner*—Suzanne Letendre

[57] ABSTRACT

A magneto-optical switch having three or more ports and two or more lenses, in which at least two ports share a common lens. In one embodiment, the switch has three ports and two lenses, where two of the ports share one of the lenses. In another embodiment, the switch has four ports and two lenses, where two of the ports share one lens and the other two ports share the other lens. A magnet generates a magnetic field in either of two directions to select one of two operating modes for the switch. Walk-off plates separate light energy into two polarized beams and rotators rotate the polarization states of those beams as a function of the magnetic field. Depending on the direction of the rotation, another walk-off plate is used either to recombine the two polarized beams or to further separate them. Further separated beams are reflected from a mirror, while converged beams are transmitted through the light-transmitting center of the mirror. Reflected light exits one port, while transmitted light exits a different port. In this way, the magnet can be used to select between different supported switch paths. Magneto-optical switches of the present invention can be configured with optical filter elements (e.g., selectively transmitting mirrors) to operate as drop/add multiplexers.

31 Claims, 4 Drawing Sheets

COMMON-LENS REFLECTIVE MAGNETO-OPTICAL SWITCH

BACKGROUND OF THE INVENTION

1. Field of the Invention

The present invention relates to data transmission, and, in particular, to optical switches and optical circulators used in light-based data transmission.

2. Description of the Related Art

In light-based data transmission systems, such as terrestrial or undersea fiber-optic communication systems, optical switches are used to selectively route light energy through a network of optical-fiber paths. For example, a three-port optical switch (having ports 1, 2, and 3) might be configured to receive light energy at port 1 and selectively route the received light energy either to port 2 (i.e., 1→2) or to port 3 (i.e., 1→3).

Some conventional optical switches are opto-mechanical switches that rely on physical movement of optical fibers to alter the state of the switch. For example, in the aforementioned three-port optical switch, the state of the switch may be changed from (1→2) to (1→3) by physically moving the optical fibers corresponding to paths 2 and 3, such that fiber 3 replaces fiber 2 at the output port of the switch. Such opto-mechanical switches tend to have reliability problems related to the mechanical nature of the switching function. These reliability problems can be especially problematic when the optical switch is part of an undersea communication system, in which case it is particularly inconvenient to repair or replace a faulty switch.

Another type of optical switch is the magneto-optical switch, in which the state of the switch is controlled by electromagnetic components within the switch. For example, the polarity of the magnetic field generated by one or more electromagnets can be used to dictate the state of the switch. One advantage of magneto-optical switches over opto-mechanical switches is that there are no moving parts that can contribute to reliability problems.

SUMMARY OF THE INVENTION

The present invention is directed to magneto-optical switches that can be used in data transmission systems such as those used in fiber-optic communication. In particular, the present invention is a magneto-optical switch, comprising three or more ports and two or more lenses, wherein the switch is adapted to switch light energy between at least one pair of ports and at least one lens is shared by two of the ports.

The invention may be implemented as a magneto-optical switch, comprising one or more walk-off plates adapted either to separate light energy into two polarized beams or to merge two polarized beams into a single converged beam, depending on the relative orientation of the walk-off plates to polarization states of the light energy; a magnet adapted to generate a magnetic field; one or more rotators adapted to rotate the polarization states of the light energy based on the direction of the magnetic field; and a mirror having a light-transmitting center. When the magnet generates the magnetic field in a first direction, the rotators rotate the polarization states of the light energy such that a walk-off plate causes the two polarized beams to merge into a converged beam that passes through the center of the mirror to exit at a first port of the switch. When the magnet generates the magnetic field in a second direction opposite to the first direction, the rotators rotates the polarization states of the light energy such that the walk-off plate causes the two polarized beams to diverge further apart such that the diverged polarized beams reflect off the mirror to exit at a second port of the switch.

In one embodiment, the present invention is a three-port magneto-optical switch, having three ports (e.g., A, B, and C in FIG. 2) and two modes of operation. The switch comprises a first lens (e.g., 202) shared by a first port (e.g., A) and a second port (e.g., B); two walk-off plates (e.g., 204 and 206); a magnet (e.g., 208); three rotators (e.g., 210–214); a third walk-off plate (e.g., 218); two polarization mode dispersion compensation elements (e.g., 216 and 220); a first prism (e.g., 222); a mirror (e.g., 224) having a light-transmitting center; a second prism (e.g., 226) ; and a second lens (e.g., 228) having a third port (e.g., C). In a first mode of operation, the switch is adapted to switch light energy from the first port to the second port and from the second port to the third port, and, in a second mode of operation, the switch is adapted to switch light energy from the third port to the second port and from the second port to the first port.

In an alternative embodiment, the present invention is a four-port magneto-optical switch, having four ports (e.g., A, B, C, and D in FIG. 4) and two modes of operation. The switch comprises a first lens (e.g., 402) shared by a first port (e.g., A) and a second port (e.g., B); two walk-off plates (e.g., 404 and 406); a magnet (e.g., 408); three rotators (e.g., 410–414) ; a third walk-off plate (e.g., 418); two polarization mode dispersion compensation elements (e.g., 416 and 420); a first prism (e.g., 422); a mirror (e.g., 424) having a light-transmitting center; a second prism (e.g., 426); and a second lens (e.g., 428) shared by a third port (e.g., C) and a fourth port (e.g., D). In a first mode of operation, the switch is adapted to switch light energy from the third port to the first port, from the first port to the second port, and from the second port to the fourth port. In a second mode of operation, the switch is adapted to switch light energy from the fourth port to the second port, from the second port to the first port, and from the first port to the third port.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

The present invention is directed to magneto-optical switches that selectively switch light energy received at an input port to one of two possible output ports, depending on the operating mode of the switch. Switches of the present invention have two modes of operation that are controlled by the direction of a magnetic field generated within the switch. The switch has a mirror with a light-transmitting slot running through the center of its otherwise reflecting surface. Depending on the operational mode and the particular input port, light energy is directed to an output port either by reflecting off the reflecting surface of the mirror or by passing through the transmitting slot in the mirror. Detailed descriptions are presented below for three-port and four-port embodiments of the present invention. In these embodiments, at least one lens is shared by two different ports of the switch.

Three-Port Switch

Figure 1:
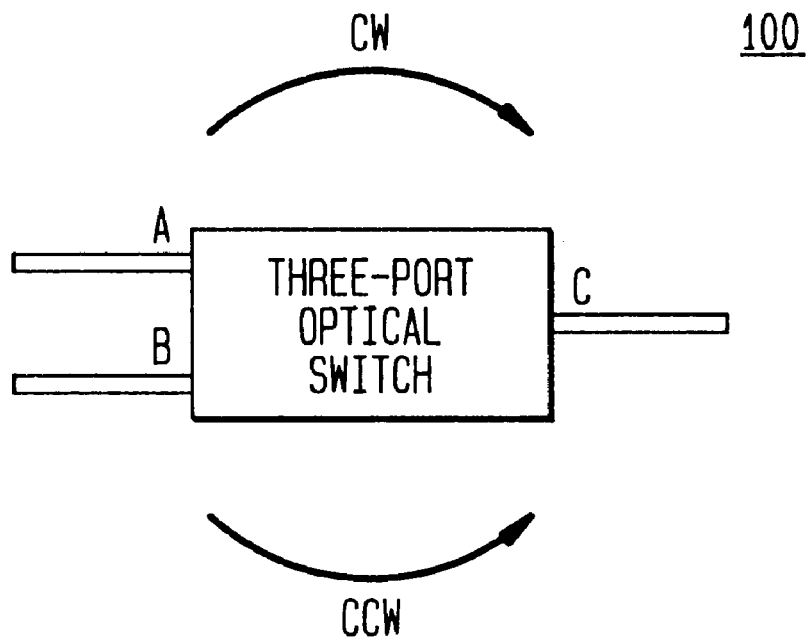
FIG. 1 shows a functional block diagram of a three-port magneto-optical switch mated to three fiber-optic cables.

FIG. 1 shows a functional block diagram of a three-port magneto-optical switch 100 mated to three fiber-optic cables at ports A, B, and C. Switch 100 has two modes of operation: a clockwise (CW) mode and a counter-clockwise (CCW) mode. In the CW mode, light energy received at port C is output at port B (i.e., C→B) and light energy received at port B is output at port A (i.e., B→A). In the CCW mode, light energy received at port A is output at port B (i.e., A→B) and light energy received at port B is output at port C (i.e., B→C). Note that switch 100 is a partial (or incomplete) circulator, since light energy received at port C cannot be switched to port A, and vice versa. That is, in the CW mode, A→C is not supported, while, in the CCW mode, C→A is not supported. In these modes, any light energy received at the unsupported input port will not be propagated by switch 100. Typically, such light energy will be dissipated within switch 100. The supported switch paths for the CW and CCW modes of switch 100 can be summarized according to the following table:

| Mode | Supported Switch Paths |
|---|---|
| CW | B→A; C→B |
| CCW | A→B; B→C |

Figure 2:
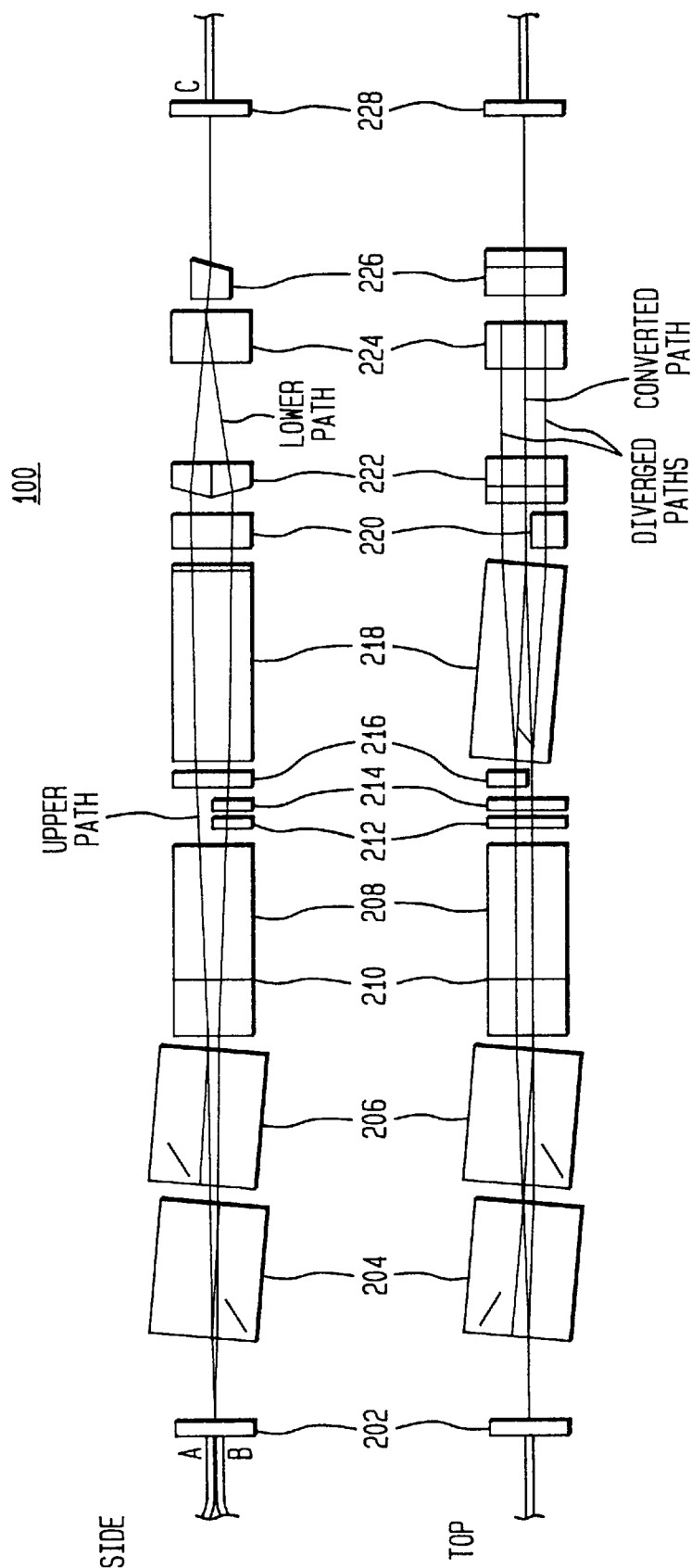
FIG. 2 shows schematic side and top views of the three-port magneto-optical switch of FIG. 1, according to one embodiment of the present invention.

FIG. 2 shows schematic side and top views of three-port magneto-optical switch 100 of FIG. 1, according to one embodiment of the present invention. Switch 100 comprises the following components:

Graded index (GRIN) or aspheric lenses 202 and 228;
Birefringent rutile walk-off plates 204, 206, and 218;
Switchable permanent magnet 208;
(Garnet) Faraday rotators 210, 212, and 214;
Polarization mode dispersion (PMD) compensation elements 216 and 220;
Prisms 222 and 226; and
Mirror 224.

Walk-off plates 204, 206, and 218 are made of a birefringent material (e.g., rutile), which means that the two different polarization states of light energy see different indices of refraction. As such, the two polarization states will propagate at different speeds through the walk-off plates. As a result of these different propagation speeds, a walk-off plate can be used to (1) separate light energy into two orthogonal linearly polarized beams, (2) further separate two such polarized beams, or (3) bring two such polarized beams closer together. The particular effect a walk-off plate will have on particular light energy depends on the orientation of the walk-off plate with respect to the polarization axes and propagation direction of the light energy. Walk-off plate 204 is rotated +45 degrees with respect to the optic axes of walk-off plate 218, and walk-off plate 206 is rotated −45 degrees with respect to walk-off plate 218. Furthermore, walk-off plates 204, 206, and 218 are tilted with respect to the longitudinal axis of switch 100 to ensure that the polarized beams are separated about the center line of the original beam.

Rotator 210 is a dual-pass rotator, meaning that both the upper and lower paths shown in the side view of FIG. 2 pass through rotator 210. Rotators 212 and 214, meanwhile, are single-pass rotators, since only the lower path passes through those rotators.

PMD compensation elements 216 and 220 operate essentially as delay lines. As shown in the top view of FIG. 2, one of the two polarized beams passes through element 216, and the other polarized beam passes through element 220. Furthermore, element 220 is twice as thick as element 216, and therefore adds twice the delay of element 216. Elements 216 and 220 are designed to equalize the optical path lengths of different polarization states by undoing the polarization mode dispersion that results when light energy propagates through walk-off plates 204, 206, and 218 at different speeds.

Prism 222 is made of two half wedges and prism 226 is made of one half wedge. As shown in the side view of FIG. 2, the upper left face of prism 222 is parallel to the right face of prism 226, and the lower left face of prism 222 has the opposite angle with respect to the longitudinal axis of switch 100 as compared to the angle of the upper left face of prism 222.

Mirror 224 has a light-transmitting slot across the middle of an otherwise light-reflecting plate. In alternative embodiments, the mirror may have a light-transmitting circle at the center of its reflecting plate, rather than a slot. The important thing is for light falling on the center of the mirror to be transmitted and for most or all other light to be reflected.

When configured as shown in FIG. 1 with two fibers attached at ports A and B of lens 202 and one fiber attached at port C of lens 228, switch 100 can be operated in either the clockwise mode or the counterclockwise mode depending on the direction of the magnetic field generated by magnet 208. Magnet 208 can generate a magnetic field in either of two opposite directions. The direction of the magnetic field depends on how magnet 208 was previously magnetized, as induced by a current pulse directed through the electromagnetic coil. When the magnetic field is in one direction, switch 100 operates in the CW mode. Conversely, when the magnetic field in is the opposite direction, switch 100 operates in the CCW mode.

The magnetic field generated by magnet 208 biases rotators 210, 212, and 214. Depending on the direction of the magnetic field, a biased rotator will rotate the polarization of light passing through the rotator in either the clockwise or counter-clockwise direction. One characteristic of a biased rotator is that it will rotate the polarization of light in the same direction whether the light is passing through the rotator from right to left or from left to right. In the particular embodiment of switch 100, rotator 210 is located inside magnet 208 and rotators 212 and 214 are located outside magnet 208. Since the direction of the magnetic field inside magnet 208 is the reverse of the direction of the magnetic field outside magnet 208, rotator 210 will rotate the polarization of light passing through it in the opposite direction from the direction that rotators 212 and 214 rotate the polarization of light passing through them. For example, if magnet 208 is magnetized to generate the magnetic field that biases rotator 210 to rotate the polarization of light in the clockwise direction, then that same magnetic field will bias rotators 212 and 214 to rotate the polarization of light in the counter-clockwise direction. In a preferred embodiment of switch 100, magnet 208 and rotators 210, 212, and 214 are designed to rotate the polarization of light passing through any one rotator by ±45 degrees, where the sign depends on the direction of the magnetic field passing through that rotator.

As described earlier in conjunction with FIG. 1, when operated in the CCW mode, switch 100 supports A→B switching and B→C switching, and, when operated in the CW mode, switch 100 supports B→A switching and C→B switching. In the following sections, each of these switch paths is described with respect to FIG. 2.

B→C Switching

For the B→C switch path of the CCW operating mode of switch 100, light energy received at port B passes through collimating lens 202 and on to walk-off plates 204 and 206 along the upper path shown in the side view of FIG. 2. Walk-off plates 204 and 206 separate the light into two orthogonal linearly polarized beams, as shown in the top view of FIG. 2. As shown in the side view of FIG. 2, light energy traveling along the upper path in FIG. 2 passes through rotator 210, but not through rotators 212 and 214. As such, only rotator 210 rotates light energy traveling in the upper path of FIG. 2.

As a result of the rotation applied by rotator 210, walk-off plate 218 operates to bring the two polarized beams together to form a single Gaussian beam, as shown in the top view of FIG. 2 as the central converged path. In one implementation, the light-transmitting slot in mirror 224 is 50% larger than the $1/e^2$ full width of the Gaussian beam. This ensures that most of the light energy in the converged beam will be transmitted through the slot in mirror 224.

Prisms 222 and 226 ensure that the light energy passing through the slot in mirror 224 will enter lens 228 at the same angle that the light energy exited from lens 202. This ensures that the light will exit lens 228 at the correct position for transmission along the fiber attached at port C. In particular, light energy traveling along the upper path in FIG. 2 will enter the top half of prism 222 (as shown in the side view of FIG. 2), pass through the slot in mirror 224, and on to prism 226. In the embodiment of FIG. 2, the upper left face of prism 222 is parallel to right face of prism 226 to ensure that light exiting prism 226 to the right will travel at the same angle as light entering prism 222 from the left along the upper path.

As shown in the top view of FIG. 2, one of the two polarized beams passes through PMD compensation element 216, while the converged beam does not pass through PMD compensation element 220. For this particular operating mode and switch path, switch 100 is designed such that element 216 delays the faster of the two polarized beams to compensate for polarization mode dispersion that results from the light energy passing through walk-off plates 204, 206, and 218.

A→B Switching

For the A→B switch path of the CCW operating mode of switch 100, light energy entering at port A is switched to exit at port B. In particular, light energy entering at port A travels from left to right along the lower path, as shown in the side view of FIG. 2. Such light passes through all three rotators 210–214. As a result of those rotations, walk-off plate 218 operates to further separate the two polarized beams generated by walk-off plates 204 and 206, rather than bringing the two beams together as a single converged beam. This beam separation is shown as the two diverged paths in the top view of FIG. 2. This means that most of the light energy will be reflected off mirror 224, rather than passing through the center mirror slot.

Light energy traveling from left to right along the lower path will pass through the lower half of prism 222 (as shown in the side view of FIG. 2), reflect off mirror 224, and travel from right to left along the upper path passing through the upper half of prism 222. In the embodiment of FIG. 2, the upper and lower left faces of prism 222 are designed such that reflected light exiting prism 222 to the left along the upper path has the opposite angle with respect to the center line as compared to light entering prism 222 from the right along the lower path.

The two polarized beams of reflected light energy traveling from right to left are slightly converged by walk-off plate 218, as shown in the top view of FIG. 2. This slightly converged light energy traveling along the upper path in the side view of FIG. 2 will then pass through only rotator 210, thereby undoing the net effects previously caused by passing from left to right through all three rotators along the lower path. Light traveling from right to left along the upper path will be further merged by walk-off plates 206 and 204 to generate a single converged beam that will exit lens 202 at the appropriate position for transmission along the fiber attached at port B, thus completing the A→B switching.

As shown in the top view of FIG. 2, one polarized beam passes through PMD compensation element 216 twice—once when traveling from left to right and once when traveling from right to left. Similarly, the other polarized beam passes through PMD compensation element 220 twice—once in each direction. In this particular operating mode and for this particular switch path, the polarized beam passing through element 216 is the slower beam. As such, element 216 has the effect of exaggerating—rather than compensating—the effects of polarization mode dispersion caused by the walk-off plates. In order to compensate for the effects of both polarization mode dispersion and element 216, element 220 is twice as thick as element 216. Since the faster beam will travel through element 220, making element 220 twice as thick as element 216 provides compensation for both the polarization mode dispersion and for the inappropriate delay added by element 216 to the slower beam. Passing light through elements 216 and 220 twice compensates for the polarization mode dispersion that will result from the light passing through each walk-off plate twice (once in each direction).

B→A Switching

For the B→A switch path of the CW operating mode of switch 100, light energy received at port B will propagate differently from that described above for the B→C switch path of the CCW operating mode. In particular, since the direction of the magnetic field is reversed for the CW operating mode, light energy received at port B and traveling from left to right along the upper path in FIG. 2 will be rotated by rotator 210 in the opposite direction from the rotation caused by rotator 210 when switch 100 is in the CCW operating mode. As such, walk-off plate 218 operates to further separate the two polarized beams, as shown in the top view of FIG. 2 as the two diverged paths, rather than bringing the two beams together as a single converged beam, as in the CCW operating mode. This means that most of the light energy traveling from left to right along the upper path will be reflected off mirror 224, rather than passing through its center mirror slot. The reflected light then travels from right to left along the lower path shown in the side view of FIG. 2.

As shown in the side view of FIG. 2, light energy traveling from left to right along the upper path will pass through the top half of prism 222, and the corresponding reflected light energy traveling from right to left along the lower path will pass through the bottom half of prism 222. The reflected light energy traveling along the lower path will also pass through all three rotators 214, 212, and 210. In this case, rotators 212 and 214 operate to undo the rotation applied twice by rotator 210—once when the light travels from left to right along the upper path and once when the light travels from right to left along the lower path.

Walk-off plates 218, 206, and 204 operate to merge the two polarized beams traveling from right to left into a single converged beam. PMD compensation elements 216 and 220 operate to compensate for polarization mode dispersion in the two polarized beams. Light traveling along the lower path will exit lens 202 at the appropriate position for transmission along the fiber attached at port A.

C→B Switching

For the C→B switch path of the CW operating mode of switch 100, light energy entering at port C is switched to exit at port B (i.e., C→B). In particular, light energy received at port C will pass through the slot in mirror 224 and travel from right to left along the upper path in the side view of FIG. 2. As shown in the top view of FIG. 2, this light energy, which bypasses PMD compensation element 220, will be separated into two polarized beams by walk-off plate 218, one of which passes through PMD compensation element 216. As shown in the side view of FIG. 2, both polarized beams will pass from right to left along the upper path through only rotator 210. This will result in rotated polarized beams that will be merged by walk-off plates 206 and 204 into a single converged beam that exits lens 202 at the appropriate position for transmission along the fiber attached at port B.

Four-Port Switch

Figure 3:
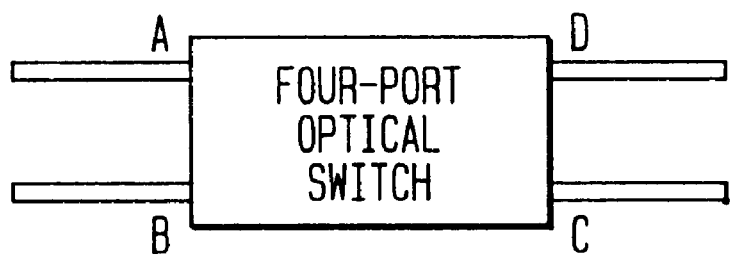
FIG. 3 shows a functional block diagram of a four-port magneto-optical switch mated to four fiber-optic cables.

FIG. 3 shows a functional block diagram of a four-port magneto-optical switch 300 mated to four fiber-optic cables at ports A, B, C, and D. Like switch 100 of FIG. 1, switch 300 has two modes of operation that are referred to in this specification as the clockwise and counter-clockwise modes of operation. In the CW mode, light energy received at port B is output at port A (i.e., B→A), light energy received at port A is output at port C (i.e., A→C), and light energy received at port D is output at port B (i.e., D→B). In the CCW mode, light energy received at port A is output at port B (i.e., A→B), light energy received at port B is output at port D (i.e., B→D), and light energy received at port C is output at port A (i.e., C→A). Note that, like switch 100 of FIG. 1, switch 300 is a partial circulator, since light energy received at port C cannot be switched to port D, and vice versa. That is, in the CW switch mode, switch 300 does not switch light received at port C, and, in the CCW switch mode, switch 300 does not switch light received at port D. The supported switch paths for the CW and CCW modes of switch 300 can be summarized according to the following table:

| Mode | Supported Switch Paths |
| --- | --- |
| CW | B→A; A→C; D→B |
| CCW | A→B; B→D; C→A |

Figure 4:
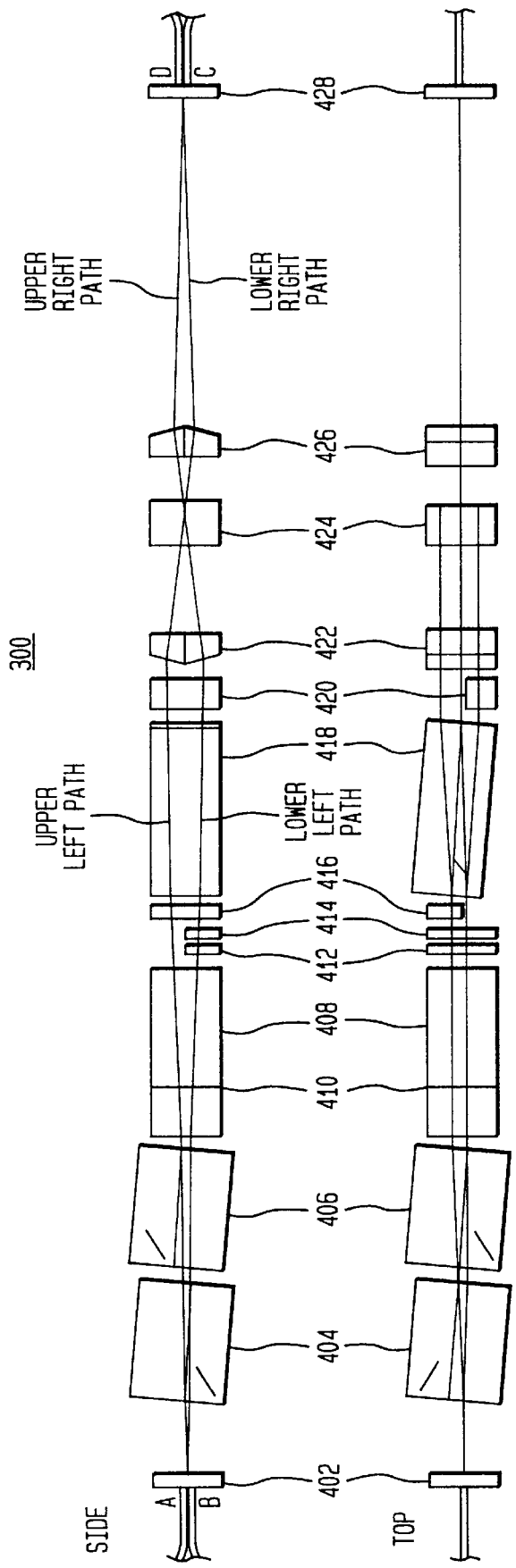
FIG. 4 shows schematic side and top views of the four-port magneto-optical switch of FIG. 3, according to one embodiment of the present invention.

FIG. 4 shows schematic side and top views of four-port magneto-optical switch 300 of FIG. 3, according to one embodiment of the present invention. Elements 402–428 of switch 300 are analogous to elements 202–228 of switch 100 with one exception: switch 300 has prism 426, which has two half wedges, instead of single half-wedge prism 226 of switch 100. In addition, switch 300 is configured with two fibers at each end. As designed and configured, switch 300 may be operated as a four-port switch based on the same general principles that applied to switch 100 of FIG. 2.

In particular, when switch 300 is operated in the CCW mode, light received at port A travels from left to right along the lower left path, is diverged by walk-off plate 418, reflects off mirror 424, travels from right to left along the upper left path, and exits via port B. This is the A→B switch path.

Similarly, in the CCW switch mode, light received at port B travels from left to right along the upper left path, is converged by walk-off plate 418, passes through the slot in mirror 424, continues traveling from left to right along the lower right path, and exits via port D. This is the B→D switch path.

Furthermore, in the CCW switch mode, light received at port C travels from right to left along the upper right path, passes through the slot in mirror 424, continues traveling from right to left along the lower left path, and exits via port A. This is the C→A switch path.

When switch 300 is operated in the CW mode, light received at port B travels from left to right along the upper left path, is diverged by walk-off plate 418, reflects off mirror 424, travels from right to left along the lower left path, and exits via port A. This is the B→A switch path.

Similarly, in the CW switch mode, light received at port A travels from left to right along the lower left path, is converged by walk-off plate 418, passes through the slot in mirror 424, continues traveling from left to right along the upper right path, and exits via port C. This is the A→C switch path.

Furthermore, in the CW switch mode, light received at port D travels from right to left along the lower right path, passes through the slot in mirror 424, continues traveling from right to left along the upper left path, and exits via port B. This is the D→B switch path.

In one implementation of the embodiments of FIGS. 2 and 4, the fibers are 125-micron optical fibers. For those sides of switches having two attached fibers (i.e., the left side of switch 100 and both sides of switch 300), the two fibers are preferably attached to the lens touching one another and oriented above and below the center line as shown in the side view of FIGS. 2 and 4. Thus, the center of each fiber is displaced 62.5 microns from the center line. This displacement from the center line affects the distance, for example, between prism 426 and lens 428 in switch 300 of FIG. 4, and therefore the overall length of the switch. The 62.5-micron displacement is the minimum possible displacement for two 125-micron fibers. Since the right side of switch 100 of FIG. 2 has only one fiber (i.e., at port C), its displacement from the center line can be smaller than 62.5 microns. This allows the distance between prism 226 and lens 228 in switch 100 to be shorter than the distance between prism 426 and lens 428 in switch 300, thereby resulting in a shorter overall length for the switch.

Drop/Add Multiplexer Using Two Three-Port Switches

Figure 5:
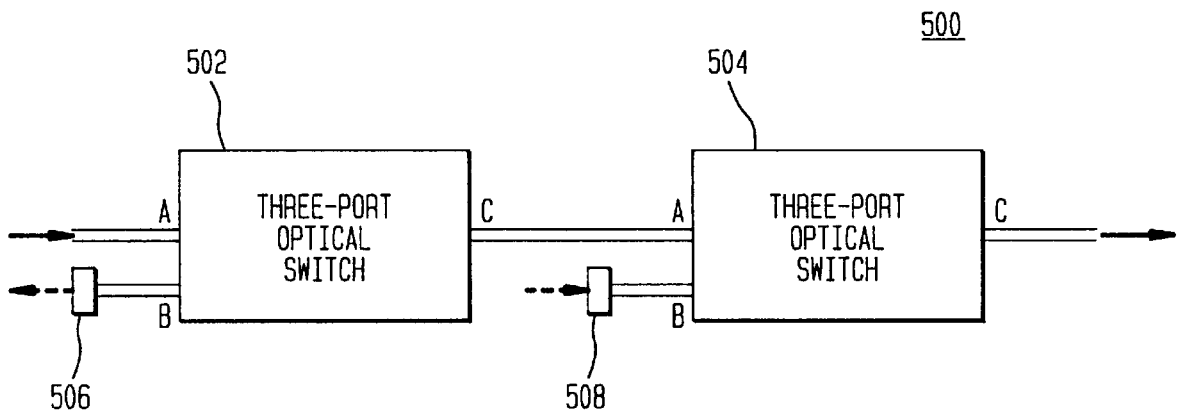
FIG. 5 shows a functional block diagram of a drop/add multiplexer, according to one embodiment of the present invention.

FIG. 5 shows a functional block diagram of a drop/add multiplexer 500, according to one embodiment of the present invention. Drop/add mux 500 has two three-port magneto-optical switches 502 and 504 and two mirrors 506 and 508, where each of switches 502 and 504 is the same as switch 100 of FIG. 2. Both of mirrors 506 and 508 transmit light in the same selected wavelength band and reflect all other light.

In one mode of operation, switches 502 and 504 are both set to the CCW mode, as described earlier with respect to switch 100 of FIGS. 1 and 2. As such, light energy received at port A of switch 502 is output at port B of switch 502. The light energy output at port B impinges on mirror 506, which transmits most of the light within the selected wavelength band and reflects all other light. The reflected light re-enters switch 502 at port B and is output at port C. The light energy output at port C is input at port A of switch 504 and output at port B of switch 504. The light energy output at port B impinges on mirror 508, which reflects most of the light (which has little light in the selected wavelength band). Additional light that is in the selected wavelength band can be added to the light reflected from mirror 508. The augmented light energy is then input back into switch 504 at port B and output at port C for further transmission.

In this way, the apparatus of FIG. 5 operates as a drop/add multiplexer that is capable of dropping a portion of its light energy corresponding to the selected wavelength band (at mirror 506) and adding a new portion of light corresponding to that same particular wavelength band (at mirror 508). Drop/add mux 500 can also be operated in the reverse direction (i.e., from port C of switch 504 to port A of switch 502) by changing switches 502 and 504 to the CW mode of operation.

In theory, it is possible to configure a single three-port optical switch of the present invention, such as switch 502 of FIG. 5, with a single filter element, such as mirror 506 of FIG. 5, to operate as a drop/add mux. In that implementation, light in the selected wavelength band can be dropped and added at the same time through mirror 506. Such an implementation will likely be impractical, however, as long as mirror 506 reflects a non-significant portion of the selected wavelength band. For example, if mirror 506 reflects 10% of the light in the selected wavelength band, this reflected signal can interfere with the added light in that same wavelength band. In the drop/add mux 500 of FIG. 5, however, the original light energy in selected wavelength band will be attenuated two times—once by mirror 506 and again by mirror 508—resulting in only 1% of the light energy leaving port C of switch 504 corresponding to the original light energy in the selected wavelength band. This level of attenuation will typically be sufficient to avoid interference with the light energy added at mirror 508.

Drop/Add Multiplexer Using a Single Four-Port Switch

Figure 6:
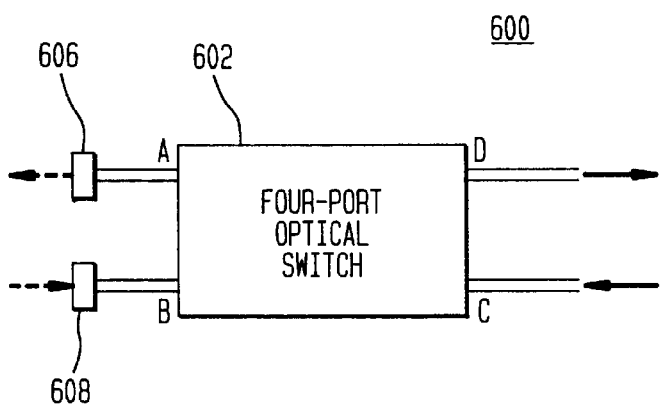
FIG. 6 shows a functional block diagram of a drop/add multiplexer, according to another embodiment of the present invention.

FIG. 6 shows a functional block diagram of a drop/add multiplexer 600, according to another embodiment of the present invention. Drop/add mux 600 has one four-port magneto-optical switch 602 and two mirrors 606 and 608, where switch 602 is the same as switch 300 of FIG. 4. Analogous to drop/add mux 500 of FIG. 5, both of mirrors 606 and 608 transmit light in a selected wavelength band and reflect of all other light.

In one mode of operation, switch 602 is set to the CCW mode, as described earlier with respect to switch 300 of FIGS. 3 and 4. As such, light energy received at port C is output at port A. The light energy output at port A impinges on mirror 606, which transmits most of the light within the selected wavelength band and reflects all other light. The reflected light re-enters switch 602 at port A and is output at port B. The light energy output at port B impinges on mirror 608, which reflects most of the light (which has little light in the selected wavelength band). Additional light that is in the selected wavelength band can be added to the light reflected from mirror 608. The augmented light energy is then input back into switch 602 at port B and output at port D for further transmission. In this way, the apparatus of FIG. 6 operates as a drop/add multiplexer that is capable of dropping a portion of its light energy corresponding to a selected wavelength band (at mirror 606) and adding a new portion of light corresponding to that same selected wavelength band (at mirror 608). Drop/add mux 600 can also be operated in the reverse direction (i.e., from port D to port C) by changing switch 602 to the CW mode of operation.

In one embodiment, mirrors 606 and 608 are implemented as a single filter element that filters light from adjacent optical fibers.

Advantages

One advantage of the magneto-optical switches of the present invention is the number of lenses used in the switch. In conventional magneto-optical switches, each light path corresponding to each port has its own lens. Thus, conventional three-port switches have three lenses. In the switches of the present invention, however, at least one lens is shared between two port paths. Thus, in three-port switch 100 of FIGS. 1 and 2, ports A and B share a common lens and switch 100 has a total of two lenses. Similarly, in four-port switch 300 of FIGS. 3 and 4, ports A and B share one lens, ports C and D share a second lens, and switch 300 again has a total of two lenses. This translates into a cost savings for the switches of the present invention over conventional magneto-optical switches.

Moreover, the switches of the present invention are self-aligning. That is, the switches have components, such as prisms and mirrors, that are designed to ensure that, no matter what switching mode is selected and no matter which switching paths are used, the switch ensures that the switched light energy will propagate in the correct direction with the correct alignment. Another advantage of the present invention is that the switches are free of half-wave or quarter-wave plates, which are present in conventional magneto-optical switches.

Those skilled in the art will understand that the principles of the present invention can be extended to other switch designs. For example, in the particular embodiments of FIGS. 2 and 4, there are three rotators, one of which is a dual-pass rotator located inside the magnet and two of which are single-pass rotators located outside the magnet. The total number of rotators in the switch, the locations of those rotators (i.e., inside or outside of the magnet), and the types of those rotators (i.e., dual-pass or single-pass) are all factors that affect the magnitudes of the rotations that need to be applied to the polarization states of the light energy passing through those rotators. The present invention covers alternative configurations of rotators. For example, in one possible alternative implementation, three rotators are all outside of the magnet, with a dual-pass rotator to the left of the magnet (as viewed in FIGS. 2 and 4) and two single-pass rotators to the right of the magnet.

In the embodiments of FIGS. 2 and 4, the switches are configurable in that they can be operated in two different modes (i.e., CW and CCW). In alternative embodiments of the present invention, the switches may be permanently configured to operate in only one of the modes.

The use of figure reference labels in the claims is intended to identify one or more possible embodiments of the claimed subject matter in order to facilitate the interpretation of the claims. Such labeling is not to be construed as necessarily limiting the scope of those claims to the embodiments shown in the corresponding figures.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A magneto-optical switch, comprising three or more ports and two or more lenses, wherein the switch is adapted to switch light energy between at least one pair of ports and at least one lens is shared by two of the ports, and further comprising:
   first means for separating light energy into two orthogonal linearly polarized beams;
   a magnet adapted to generate a magnetic field;
   one or more rotators adapted to rotate light energy based on the direction of the magnetic field;
   second means for converging the polarized beams, when the magnetic field is in a first direction, and for further separating the polarized beams, when the magnetic field is in a second direction; and
   a mirror having a light-transmitting center, wherein:
      when the magnetic field is in the first direction, the converged polarized beams are transmitted through the center of the mirror to exit at a first port; and
      when the magnetic field is in the second direction, the separated polarized beams are reflected off the mirror to exit at a second port.

2. The invention of claim 1, comprising exactly three ports and two lenses, wherein a first lens is shared by two of the ports.

3. The invention of claim 1, comprising exactly four ports and two lenses, wherein a first lens is shared by a first pair of the ports and a second lens is shared by a second pair of the ports.

4. The invention of claim 1, wherein the switch has two modes of operation, wherein:
   in a first mode, the switch is adapted to switch light energy between a first set of pairs of ports; and
   in a second mode, the switch is adapted to switch light energy between a second set of pairs of ports, different from the first set of pairs of ports.

5. The invention of claim 4, further comprising a magnet that controls the mode of the switch.

6. The invention of claim 1, wherein the first and second means comprise walk-off plates.

7. The invention of claim 1, further comprising a mirror, wherein the mirror is adapted to reflect light energy switched between a pair of ports sharing the same lens.

8. The invention of claim 1, wherein light energy switched between pairs of ports is self-aligned by the switch.

9. The invention of claim 1, wherein the switch is free of half-wave and quarter-wave plates.

10. The invention of claim 9, wherein the switch is free of any wave plates.

11. The invention of claim 1, further comprising one or more polarization mode dispersion compensation elements adapted to compensate for polarization mode dispersion in the switch.

12. A magneto-optical switch, comprising:
   one or more walk-off plates adapted either to separate light energy into two polarized beams or to merge two polarized beams into a single converged beam, depending on the relative orientation of the walk-off plates to polarization states of the light energy;
   a magnet adapted to generate a magnetic field;
   one or more rotators adapted to rotate the polarization states of the light energy based on the direction of the magnetic field; and
   a mirror having a light-transmitting center, wherein:
      when the magnet generates the magnetic field in a first direction, the rotators rotate the polarization states of the light energy such that a walk-off plate causes the two polarized beams to merge into a converged beam that passes through the center of the mirror to exit at a first port of the switch; and
      when the magnet generates the magnetic field in a second direction opposite to the first direction, the rotators rotates the polarization states of the light energy such that the walk-off plate causes the two polarized beams to diverge further apart such that the diverged polarized beams reflect off the mirror to exit at a second port of the switch.

13. The invention of claim 12, further comprising one or more polarization mode dispersion compensation elements adapted to compensate for polarization mode dispersion resulting from light energy passing through the walk-off plates.

14. The invention of claim 12, further comprising at least one lens shared by at least two ports.

15. A three-port magneto-optical switch, having three ports and two modes of operation, the switch comprising:
   a first lens shared by a first port and a second port;
   two walk-off plates;
   a magnet;
   three rotators;
   a third walk-off plate;
   two polarization mode dispersion compensation elements;
   a first prism;
   a mirror having a light-transmitting center;
   a second prism; and
   a second lens having a third port, wherein:
      in a first mode of operation, the switch is adapted to switch light energy from the first port to the second port and from the second port to the third port; and
      in a second mode of operation, the switch is adapted to switch light energy from the third port to the second port and from the second port to the first port.

16. The invention of claim 15, wherein, in the first mode of operation, the magnet generates a magnetic field in a first direction and, in the second mode of operation, the magnet generates a magnetic field in a second direction different from the first direction.

17. The invention of claim 15, wherein,
   in the first mode of operation, light energy received at the first port is reflected off the mirror and exits at the second port, and light energy received at the second port is transmitted through the center of the mirror and exits at the third port; and
   in the second mode of operation, light energy received at the second port is reflected off the mirror and exits at the first port, and light energy received at the third port is transmitted through the center of the mirror and exits at the second port.

18. The invention of claim 15, wherein the first prism comprises two half wedges and the second prism comprises one half wedge.

19. The invention of claim 15, wherein the switch is a first three-port magneto-optical switch configured in a drop/add multiplexer further comprising:
   a second three-port magneto-optical switch connected at a first port to the third port of the first switch;
   a first partially transmitting mirror connected at the second port of the first switch; and
   a second partially transmitting mirror connected at the second port of the second switch, wherein, when operated in a first mux mode:

light energy received at the first port of the first switch is switched to the second port of the first switch, wherein the first partially transmitting mirror is adapted to transmit some of the light energy and reflect other of the light energy;

the reflected light energy is received at the second port of the first switch and switched to the third port of the first switch, wherein the reflected light energy is transmitted to the first port of the second switch;

the light energy received at the first port of the second switch is switched to the second port of the second switch, wherein the second partially transmitting mirror is adapted to reflect the received light energy and receive additional light energy that is added to the reflected light energy through the second mirror to generate augmented light energy; and the augmented light energy is received at the second port of the second switch and switched to the third port of the second switch, wherein the augmented light energy is exited from the drop/add multiplexer.

20. The invention of claim 19, wherein, when operated in a second mux mode:

light energy received at the third port of the second switch is switched to the second port of the second switch;

the second mirror is adapted to transmit some of the light energy and reflect other of the light energy;

the reflected light energy is switched from the second port of the second switch to the first port of the second switch;

the reflected light energy is transmitted from the first port of the second switch to the third port of the first switch;

the reflected light energy is switched from the third port of the first switch to the second port of the first switch;

the first mirror is adapted to reflect the reflected light energy and add additional light energy to generate augmented light energy; and the augmented light energy is switched from the second port of the first switch to the first port of the first switch, wherein the augmented light energy is exited from the drop/add multiplexer.

21. The invention of claim 15, wherein:

light energy from the first port and light energy from the second port pass through the first lens;

the two walk-off plates separate the light energy into two polarized beams;

at least one of the three rotators rotates the polarized beams with the rotation applied by one of the rotators being based on a magnetic field generated by the magnet;

one of the polarized beams passes through one of the polarization mode dispersion compensation elements;

the third walk-off plate either converges or further separates the two polarized beams, depending on the magnetic-field-based rotation;

the other of the polarized beams passes through the other of the polarization mode dispersion compensation elements, if the third walk-off plate further separates the two polarized beams;

the first prism directs the polarized beams towards the mirror, which reflects the polarized beams, if the third walk-off plate further separates the two polarized beams, and passes the polarized beams through the light-transmitting center of the mirror, if the third walk-off plate converges the two polarized beams;

the second prism directs the converged polarized beams passing through the light-transmitting center of the mirror towards the second lens for transmission to the third port.

22. A four-port magneto-optical switch, having four ports and two modes of operation, the switch comprising:

a first lens shared by a first port and a second port;

two walk-off plates;

a magnet;

three rotators;

a third walk-off plate;

two polarization mode dispersion compensation elements;

a first prism;

a mirror having a light-transmitting center;

a second prism; and a second lens shared by a third port and a fourth port, wherein:

in a first mode of operation, the switch is adapted to switch light energy from the third port to the first port, from the first port to the second port, and from the second port to the fourth port; and in a second mode of operation, the switch is adapted to switch light energy from the fourth port to the second port, from the second port to the first port, and from the first port to the third port.

23. The invention of claim 22, wherein, in the first mode of operation, the magnet generates a magnetic field in a first direction and, in the second mode of operation, the magnet generates a magnetic field in a second direction different from the first direction.

24. The invention of claim 22, wherein, in the first mode of operation, light energy received at the first port is reflected off the mirror and exits at the second port, light energy received at the second port is transmitted through the center of the mirror and exits at the fourth port, and light energy received at the third port is transmitted through the center of the mirror and exits at the first port; and in the second mode of operation, light energy received at the second port is reflected off the mirror and exits at the first port, light energy received at the first port is transmitted through the center of the mirror and exits at the third port, and light energy received at the fourth port is transmitted through the center of the mirror and exits at the second port.

25. The invention of claim 22, wherein each of the first and second prisms comprises two half wedges.

26. The invention of claim 22, wherein the switch is configured in a drop/add multiplexer further comprising:

a first partially transmitting mirror connected at the first port; and a second partially transmitting mirror connected at the second port, wherein, when operated in a first mux mode:

light energy received at the third port is switched to the first port, wherein the first partially transmitting mirror is adapted to transmit some of the light energy and reflect other of the light energy;

the reflected light energy is received at the first port and switched to the second port, wherein the second partially transmitting mirror is adapted to reflect the reflected light energy and receive additional light energy that is added to the reflected light energy through the second mirror to generate augmented light energy; and the augmented light energy is received at the second port and switched to the fourth port, wherein the augmented light energy is exited from the drop/add multiplexer.

27. The invention of claim 26, wherein, when operated in a second mux mode:

light energy received at the fourth port is switched to the second port;

the second mirror is adapted to transmit some of the light energy and reflect other of the light energy;

the reflected light energy is switched from the second port to the first port;

the first mirror is adapted to reflect the reflected light energy and add additional light energy to generate augmented light energy; and the augmented light energy is switched from the first port to the third port, wherein the augmented light energy is exited from the drop/add multiplexer.

28. The invention of claim 22, wherein:

light energy from the first port and light energy from the second port pass through the first lens;

the two walk-off plates separate the light energy into two polarized beams;

at least one of the three rotators rotates the polarized beams with the rotation applied by one of the rotators being based on a magnetic field generated by the magnet;

one of the polarized beams passes through one of the polarization mode dispersion compensation elements;

the third walk-off plate either converges or further separates the two polarized beams, depending on the magnetic-field-based rotation;

the other of the polarized beams passes through the other of the polarization mode dispersion compensation elements, if the third walk-off plate further separates the two polarized beams;

the first prism directs the polarized beams towards the mirror, which reflects the polarized beams, if the third walk-off plate further separates the two polarized beams, and passes the polarized beams through the light-transmitting center of the mirror, if the third walk-off plate converges the two polarized beams;

the second prism directs the converged polarized beams passing through the light-transmitting center of the mirror towards the second lens for transmission to one of the third and fourth ports.

29. A magneto-optical switch, comprising three or more ports and two or more lenses, wherein the switch is adapted to switch light energy between at least one pair of ports and at least one lens is shared by two of the ports, wherein light energy switched between pairs of ports is self-aligned by the switch.

30. A magneto-optical switch, comprising three or more ports and two or more lenses, wherein the switch is adapted to switch light energy between at least one pair of ports and at least one lens is shared by two of the ports, wherein the switch is free of half-wave and quarter-wave plates.

31. The invention of claim 30, wherein the switch is free of any wave plates.

* * * * *